Sept. 14, 1965 C. J. VAN DALEN 3,206,726

READING DEVICE FOR AN INFORMATION BEARER

Filed Nov. 19, 1962

INVENTOR.
C. J. VAN DALEN

BY Hugh A. Kirk

ATTORNEY

United States Patent Office 3,206,726
Patented Sept. 14, 1965

3,206,726

READING DEVICE FOR AN INFORMATION BEARER

Christiaan Johannes Van Dalen, Leidschendam, Netherlands, assignor to De Staat der Nederlanden, ten Deze Vertegenwoordigd Door de Directeur-Generaal der Posterijen, Telegrafie en Telefonie, The Hague, Netherlands Filed Nov. 19, 1962, Ser. No. 238,559
Claims priority, application Netherlands, Nov. 24, 1961, 271,826
12 Claims. (Cl. 340—146.3)

The invention relates to a reading device for an information bearer provided with rows of characters arranged in each row in groups and which distinguish themselves by scannable elements; and in which the information bearer moves with respect to the scanners in the direction of the rows and the reading results for the characters within a group are passed with a certain periodicity depending on the position of the relevant elements to the output terminal of the reading device.

Such a reading device is known from applicant's copending U.S. patent application Serial No. 234,745, filed November 1, 1962.

In this device a character is read by means of scanners arranged in columns. The reading result of a character is passed to the output terminal as soon as one scanner in each of the outer columns observes a code element contrasting with the background, i.e. a mark. All the code elements are incorporated in the character in the device of said application S.N. 234,745. In the case of a uniform speed of the information bearer and a placing of the characters within a group with equal distances between each character the reading results are passed on with a certain periodicity.

The code elements can also be located entirely or partly outside the character and marking elements governing the passing-on of the scanning results can be provided outside the character too.

Now in all these case, however, it is possible that, in the reading process, characters are skipped without being perceived, which, especially in the case of numbers, is inadmissible. This skipping can be caused either: (1) because in the first case the printer has indistinctly printed the relevant code elements in the character itself or the marking-elements, or (2) because the reading device has temporarily been out of order.

The invention aims at detecting when characters are missed, or in other words, as signalling the skipping of characters within a group. According to this invention, this has been achieved in such a way that the reading device contains a blocking device having a time constant and a fault indicator. The blocking device, in the case of an information bearer on which each group of characters is preceded and followed by an initial mark and a final mark, respectively, different from the characters, is put in the inactive and the active state, after the scanning of an initial mark and a final mark, respectively. When the blocking device is active, the contingent scanning results are prevented from being passed on. Also the blocking device is put into its active state by a time constant control which is about 1½ times the specified period in which the scanning of a character occurs, and during the time a character has failed to occur.

The above mentioned and other features and objects of this invention and the manner of attaining them will become more apparent and the invention itself will be understood best by reference to the following description of embodiments of the invention taken in conjunction with the accompanying drawings, wherein.

Figure 1:
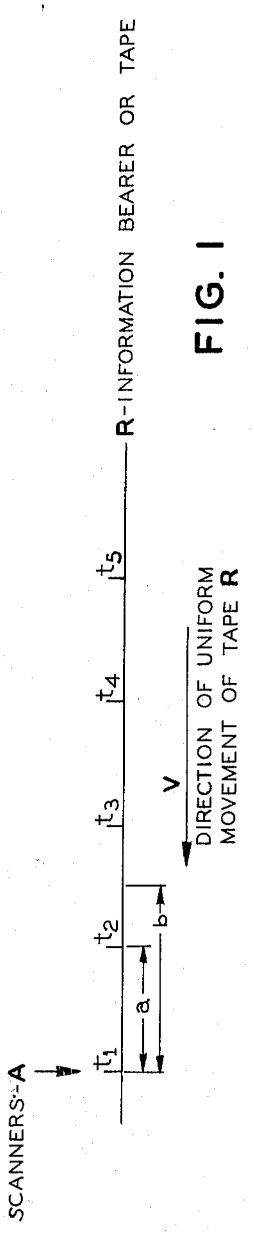
FIG. 1 is a diagram showing the relative location of the characters on an information bearer, from which is determined the choice of the time constant of the blocking device of the invention.

The information bearer provided with the characters to be scanned, $t1$, $t2$, etc., are moved at a uniform speed $v$ past the scanners A (FIG. 1). As soon as the initial mark of a group has been scanned, each of the following characters is scanned after a lapse of time determined by the speed $v$ and the distance $a$ between the characters. If this does not happen, a character has been skipped and the reading device ought to signal this. Now the time constant of the blocking device provided in the reading device for this purpose is preferably adjusted at 1½ times the interval between two readings, i.e. the time required for moving the information bearer over the distance $b$. So the time constant $k$ (i.e. the time for the information bearer to travel the distance $b$) and the speed $v$ need not be exactly adjusted to the correct value. Be it assumed first that an exact adjustment is necessary indeed as regards the speed $v$, the time constant $k$ may be so much shorter that the second character $t2$ is just observed within this time and so much longer that the reading of the third character occurs just after this time $k$. So the time constant may deviate by 33⅓% upwards and downwards. Be it assumed further that the time constant $k$ is exactly adjusted to 1½ times the interval between two readings, the speed may decrease so much that the second character $t2$ is just observed within that interval, or increase so much that the reading of the third character occurs just after that interval. So the speed $v$ may deviate by 33⅓% upwards and downwards. Apart from this, irregularities also may occur in the information bearer and characters. So all the deviations from the nominal values together may amount to 33⅓%.

Figure 2:
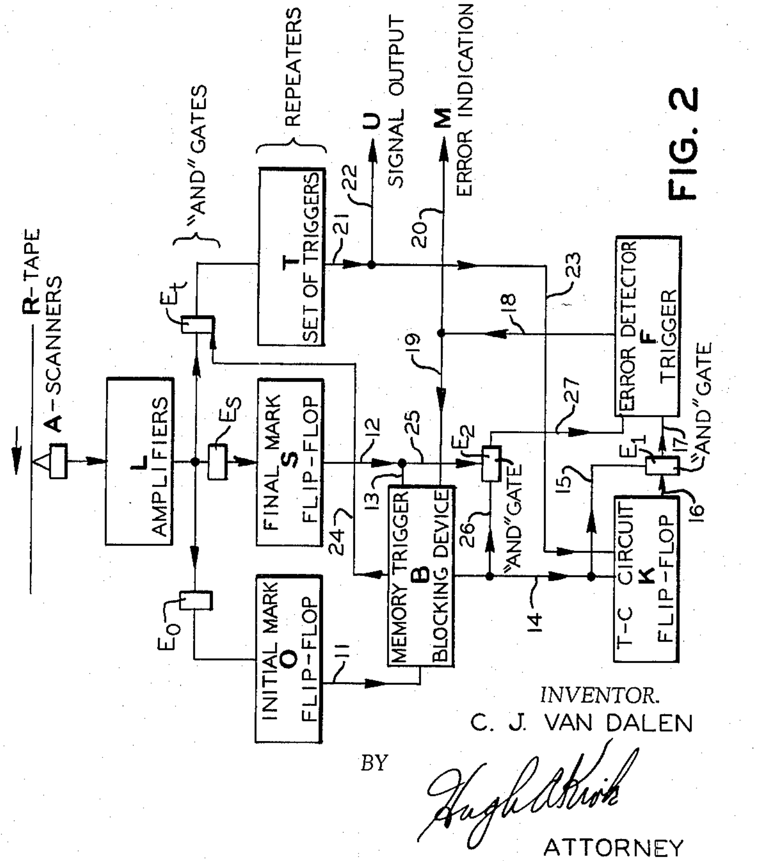
FIG. 2 is a schematic block wiring diagram of the reading device according to one embodiment of this invention in which the initial and final marks are different.

FIG. 2 shows a schematic block wiring diagram of one embodiment of a reading device according to this invention, and relates to the case wherein each of the groups of characters on the information bearer is preceded by an initial mark $o$ and followed by a final mark $s$.

The information bearer R is moved past the scanners A. These scanners are connected to amplifiers L, which, in their turn, control the repeaters O, S and T via gates $E_o$, $E_s$ and $E_t$ respectively. The repeaters O and S are connected to different input terminals via conductors 11 and 12, 13, respectively of the blocking device B, to the output of which device B a circuit K having a time constant has been connected via conductor 14. Output terminals of these latter circuits B and K are connected via conductors 15 and 16, respectively, through an "and"-circuit E1 and conductor 17 to an input terminal of the error detector F, the output terminal of which is connected via conductors 18 and 19 to an input terminal of the blocking device B and via conductors 18 and 20 to the output terminal M of the whole reading device. The output terminals of the repeater T are connected via conductors 21 and 22 to other output terminals U of the whole reading device and via conductors 21 and 23 to another input terminal of the time-constant circuit K. Another output terminal of the blocking device B is connected via conductor 24 to the other input terminals of the repeater T. Finally the output terminal of the repeater S via conductors 12 and 25 and an output terminal of the blocking device B via conductor 26 are connected through an "and"-circuit E2 and conductor 27 to another input terminal of the error detector F.

When a character of the information bearer R moves past the scanners A, the pulses produced in these scanners, after having been amplified in the amplifiers L, are applied to the repeaters O, S and T. Each of the repeaters O and S comprises a flip-flop circuit fed by the "and" circuit $E_o$ and $E_s$ respectively, and said flip-flops are put, by the initial and the final markings *o* and *s* respectively, from their normal states into their unstable state.

The repeater T on the other hand consists of a set of triggers fed through "and" gates $E_t$ so that each of the characters as well as the initial and the final marks *o* and *s* puts one of the triggers of the set from its normal state into its operative state. This changes of state, however, are only passed via conductors 21 and 22 to the output terminal U, as long as the blocking device B is not blocking said set of triggers T via conductor 24.

As soon as the repeater O has been put into its unstable state due to the reception of the initial mark *o*, it puts the blocking device B comprising a bistable trigger or memory circuit into its inactive state. This device B remains in this inactive state so that the signals scanned can be passed to the output terminal U.

Right from the moment when the blocking device B assumed its inactive state, the time-constant circuit K is put into its unstable state. This circuit K is a flip-flop which returns to its normal state by a time-constant *k*, which, as has been described in connection with FIG. 1, is derived from the speed *v* and the distance *b*. Each time a signal is passed via conductors 21 and 22 to the output terminal U, the flip-flop K also receives from the receiver set of triggers T, a pulse which resets it into its initial unstable state again, so as to prevent it from returning to its normal state. Then, as soon as the final mark *s* is received by the repeater S, the repeater S is put into its unstable state to deliver a pulse via conductors 12 and 13 to the second input terminal of the blocking device B, which then puts the device B into its active state again and which in turn causes the time constant circuit K to return to its normal state or to become inactive.

If, however, during the reading of a group of characters, a character is skipped, the flip-flop K does not receive a pulse in the time *k* which would prevent it from returning to its normal or inactive state. Then as soon as the flip-flop K reaches its normal state after the expiration of the time *k*, it puts the error detector F, which may be a trigger, into its operative state via the "and"-circuit E1. This "and" circuit E1 has its input terminal also connected to the output terminal of the still inactive blocking device B. The error or fault detector F then causes a signal to be conducted via conductors 18 and 20 to the output terminal M to indicate that a signal has been skipped. At this same time the blocking device B is put into its active state via conductors 18 and 19, the fault indicator F is returned to its normal state again. Because an output terminal of the blocking device B is also connected via conductor 24 to the input terminals of the "and"-circuits $E_t$ of the triggers of the repeater T, further signals are prevented from passing to the output terminal U. The next initial mark *o* makes the blocking device B inactive again.

If the initial mark *o* is skipped, the reading results of the characters of the next group are not passed via conductors 21 and 22 to the output terminal U. When the final mark *s* appears then, the error detector F is put in the operative state via the output terminal and conductor 27 of the "and"-circuit E2, the input terminals of which are not only connected via conductors 12 and 25 to the output terminal of the repeater S, but also via conductor 26 to the output of the blocking device B, which device B is in its normal or active state because the mark *o* had been skipped and repeater O was not operated.

Figure 3:
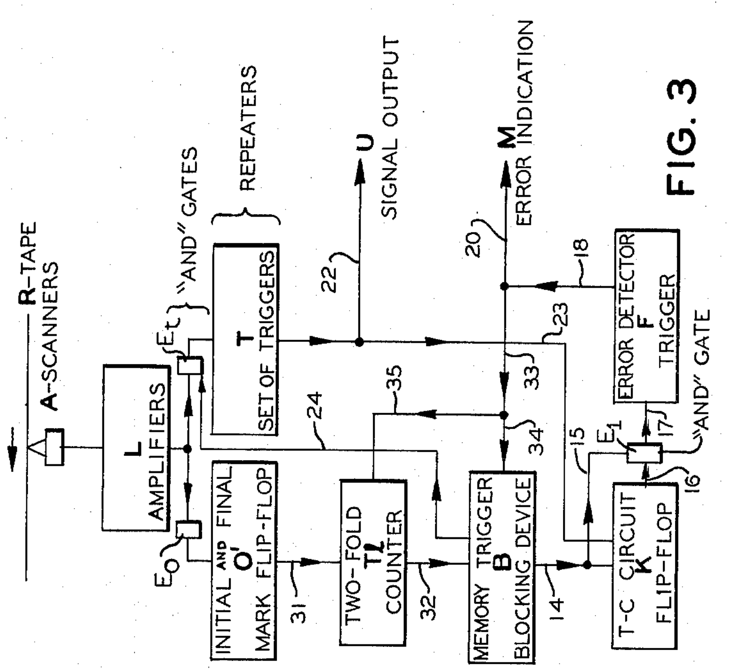
FIG. 3 is a schematic block wiring diagram, similar to FIG. 2, of another embodiment of this invention but in which the initial and final marks are alike.

It is also feasible to take one and the same mark for initial mark and for the final mark. The slightly modified block diagram of such a relevant reading device is shown in FIG. 3. It has been assumed in this case that the initial mark *o* is also used as the final mark. So then there is no repeater S, which means that the output terminal of the repeater O' can not be connected directly to an input terminal of the blocking device B, but instead must be connected via conductor 31 to a two-fold counter T1, which in turn is connected via the conductor 32 to a blocking device B. Correspondingly, the output terminal of the error-detector F is not only connected via conductors 18, 33 and 34 to the blocking device B in this case, but also via conductors 18, 33 and 35 to this counter T1. Thus "and"-circuit E2 is not required.

After the reading of the initial mark *o* of a group of characters, the counter T1 passes to its first state, making the blocking device B inactive, and after the second reading of this mark *o*, it passes to its second state, which is the initial state and makes the blocking device B active again.

If a character has been skipped, the circuit K in FIG. 3 returns to the normal state in the same way as has been described in connection with the embodiment of FIG. 2, due to which the error indicator F is put in the operative state via the "and"-circuit E1. The blocking device B is put in the operative state again by the error indicator F via conductors 18, 33 and 34 and then the counter T1 via conductors 18, 33 and 35 is also put into its corresponding second state.

As the characters occur in groups, there will always be an interval larger than *b* between the final mark *o* and the initial mark *o*. If the final mark *o* is read as an initial mark, because the initial mark (or some other character) has been skipped, the circuit K will assume the normal state because of the interval between the groups. Accordingly the blocking device B is put again into its operative state in consequence thereof, and an error is signaled via output terminal M. When the next mark *o* is scanned then, the blocking device B becomes inactive in the normal way.

While I have illustrated and described what I regard to be the preferred embodiment of my invention, nevertheless it will be understood that such is merely exemplary and that numerous modifications and rearrangements may be made therein, without departing from the essence of the invention.

I claim:

1. A reading device for a group of equally spaced scannable characters on an information bearer, each group being preceded by an initial and followed by a final scannable mark different from said characters, said device comprising:

(a) means for successively scanning said marks and characters in each group at a predetermined constant rate, (b) means connected to said scanning means for detecting said initial and said final marks of each group, (c) means connected to said scanning means for repeating the signals derived from all of said scanned characters, (d) blocking means connected to said repeating means for normally blocking said repeating means, said blocking means also being connected to said detecting means to unblock said repeating means in response to an initial mark and to reblock said repeating means in response to a final mark, (e) time-constant means connected to said blocking means and to said repeating means to operate for about one and a half times the period between the scanning of successive characters in said group, and (f) error detector means connected to said time-constant means and to said blocking means for indicating an error and for controlling said blocking means so as to block said repeating means when one of said characters in said group has been skipped by said scanning means.

2. A device according to claim 1 wherein said dectecting means, said error detector means, and said time-constant means each comprise a flip-flop circuit.

3. A device according to claim 1 wherein said repeating means comprises a set of triggers.

4. A device according to claim 1 wherein said blocking means comprises a memory trigger.

5. A device according to claim 1 wherein said error detector means includes an "and" circuit in its connections to said time-constant means and to said blocking means.

6. A device according to claim 1 including amplifiers between said scanning means and each of said detecting means and said repeating means.

7. A device according to claim 1 including "and" circuits between said scanning means and each of said detecting means and said repeating means.

8. A device according to claim 1 wherein said detecting means includes separate flip-flops for detecting said initial and final marks of each group of characters.

9. A device according to claim 8 including an "and" circuit in a connection from both said final mark detecting means and said blocking means to said error detector means.

10. A device according to claim 1 including a two-fold counter means connected between said detecting means and said blocking means, and including a connection from said detector means to said counter means for controlling said counter means with said blocking means.

11. A reading device for a group of equally spaced scannable characters on an information bearer, each group being preceded by an initial and followed by a final scannable mark different from said characters, said device comprising:

(a) means for successively scanning said marks and characters in each group at a predetermined constant rate, (b) means connected to said scanning means for detecting said initial mark of each group, (c) means connected to said scanning means for detecting said final mark of each group, (d) means connected to said scanning means for repeating the signals derived from all of said scanned characters, (e) blocking means connected to repeating means for normally blocking said repeating means, said blocking means also being connected to both said detecting means to unblock said repeating means in response to an initial mark and to reblock said repeating means in response to final mark, (f) time-constant means connected to said blocking means and to said repeating means to operate for about one and one half times the period between the scanning of successive characters in said group, and (g) error detecting means connected via a first "and" circuit to said time-constant means and to said blocking means, and via a second "and" circuit to said final mark detecting means and said blocking means, for indicating an error and for controlling said blocking means so as to block said repeating means when any one of said characters in said column has been skipped by said scanning means.

12. A reading device for a group of equally spaced scannable characters on an information bearer, each group being preceded by an initial and followed by a final scannable mark different from said characters, said device comprising:

(a) means for successively scanning said marks and characters in said group at a predetermined constant rate, (b) means connected to said scanning means for detecting the initial and final marks of each group, (c) means connected to said scanning means for repeating the signals derived from all of said scanned characters, (d) a two-fold counter means connected to said detecting means for counting the initial and the final mark of each group, (e) blocking means connected to said repeating means for normally blocking said repeating means, said blocking means also being connected to said counter means to unblock said repeating means in response to an initial mark and to reblock said repeating means in response to a final mark.

(f) time-constant means connected to said blocking means and to said repeating means to operate for about one and a half times the period between the scanning of successive characters in said group, and (g) error detector means connected via an "and" circuit to said time-constant means and to said blocking means for indicating an error and for controlling said counter means and said blocking means so as to block said repeating means when any one of said characters in said group has been skipped by said scanning means.

References Cited by the Examiner

UNITED STATES PATENTS

| | | | |
|---|---|---|---|
| 3,092,809 | 6/63 | Merritt et al. | 340—146.3 |
| 3,160,853 | 12/64 | Howard | 340—146.3 |
| 3,165,717 | 1/65 | Eckelman et al. | 340—146.3 |

MALCOLM A. MORRISON, *Primary Examiner.*